May 15, 1956     C. W. SCHLEGEL     2,745,535
BEAM TURNING DEVICE
Filed Oct. 21, 1949                           4 Sheets-Sheet 1
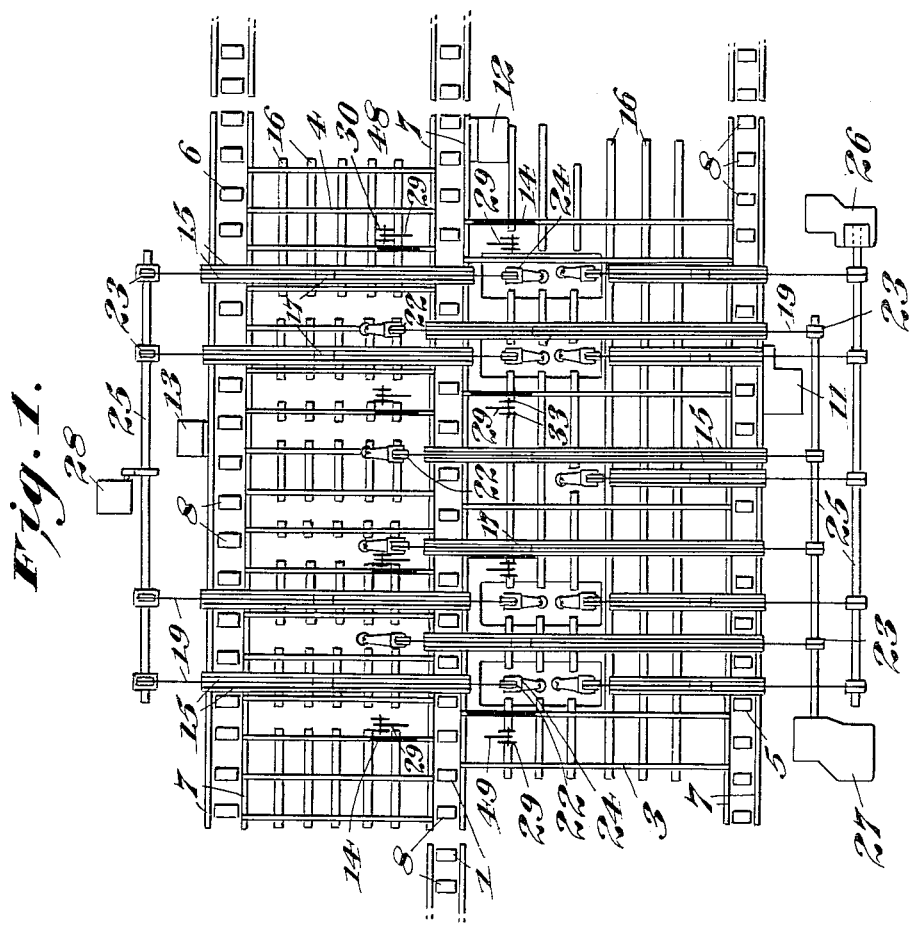
Inventor
Carl W. Schlegel.
By R. S. C. Dougherty.
Attorney

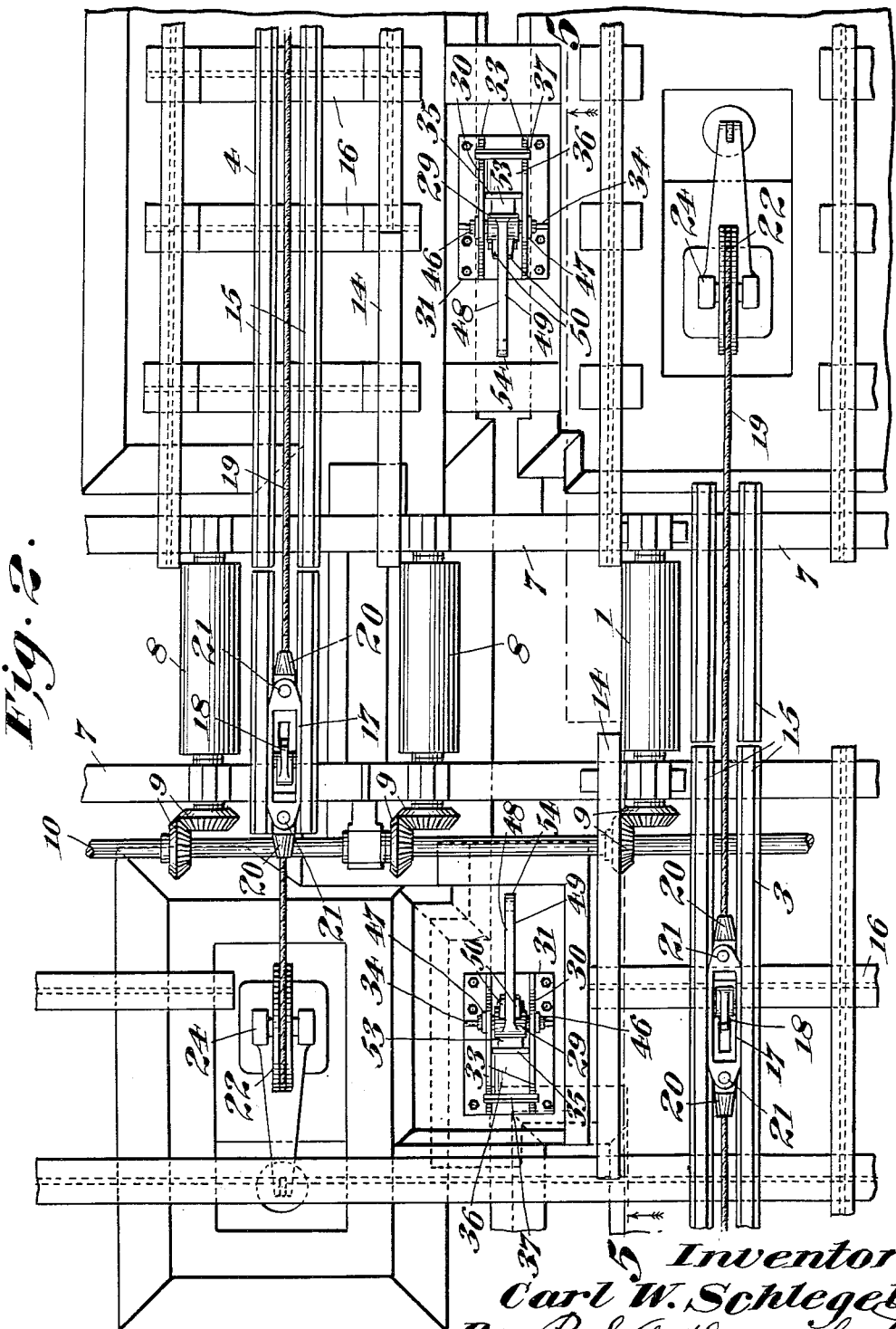

May 15, 1956 — C. W. SCHLEGEL — 2,745,535
BEAM TURNING DEVICE
Filed Oct. 21, 1949 — 4 Sheets-Sheet 3
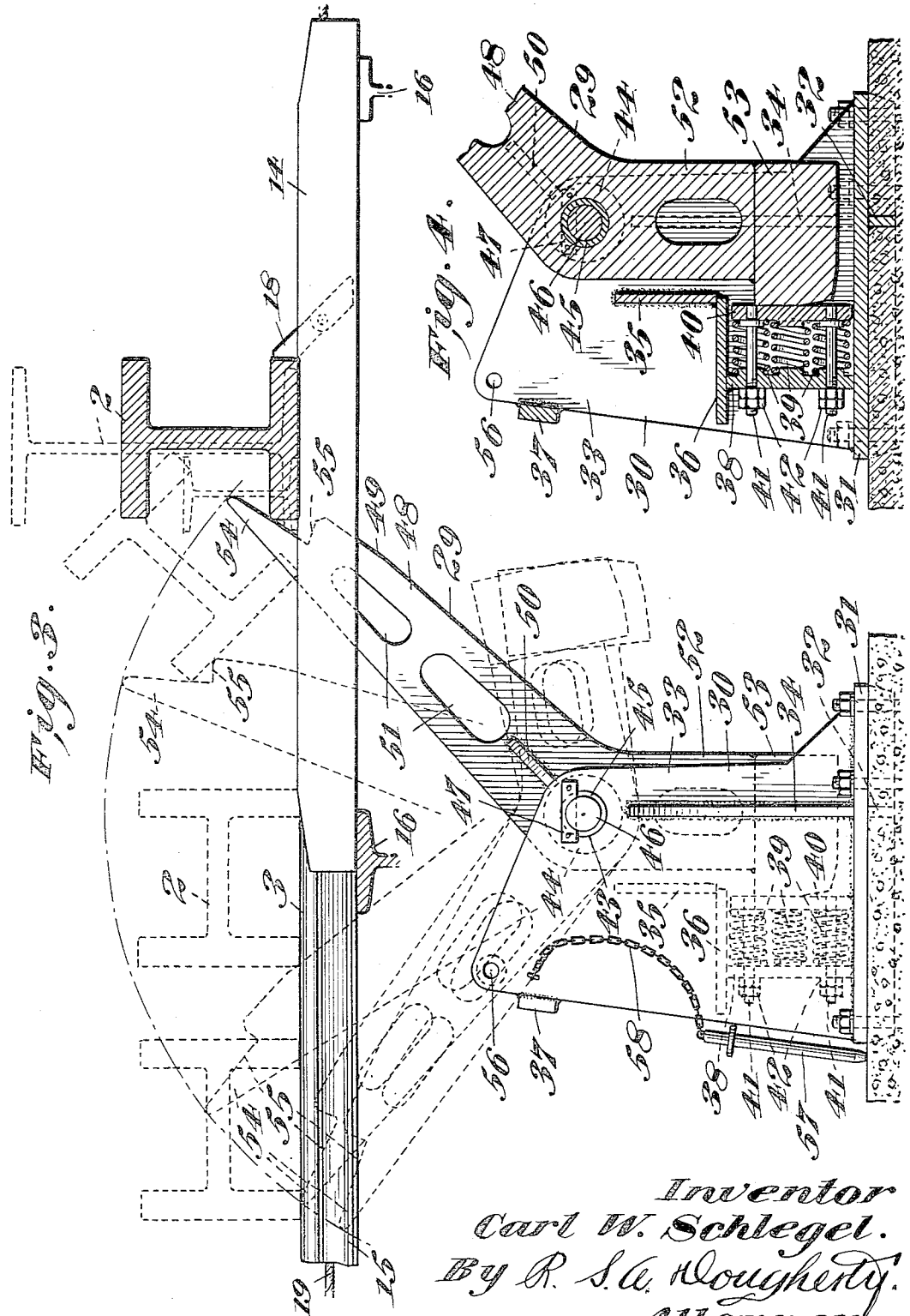
Inventor
Carl W. Schlegel.
By R. S. A. Dougherty
Attorney May 15, 1956
C. W. SCHLEGEL
2,745,535
BEAM TURNING DEVICE
Filed Oct. 21, 1949
4 Sheets-Sheet 4
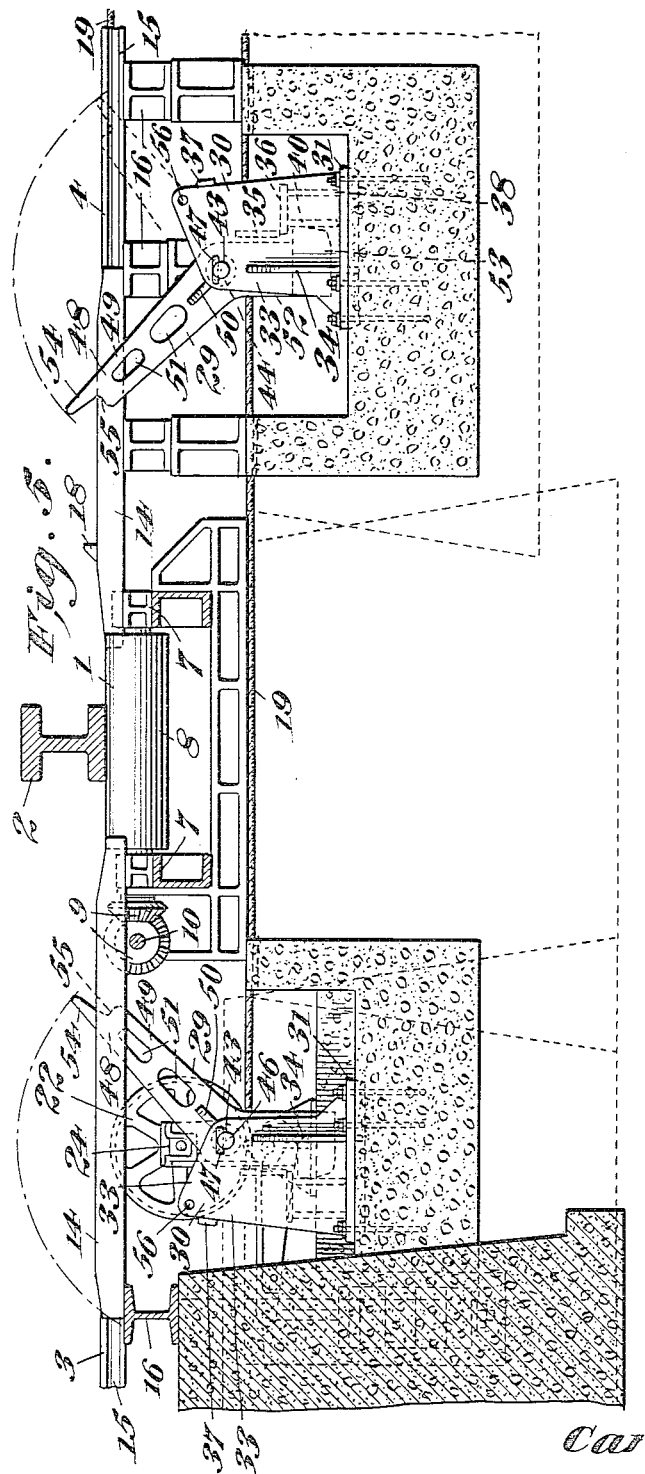
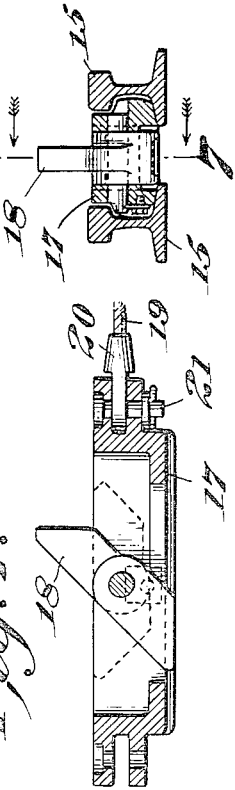
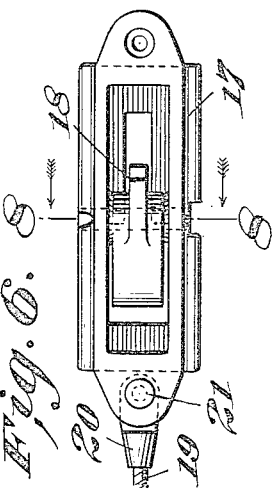
Inventor
Carl W. Schlegel.
By R. S. A. Dougherty
Attorney

United States Patent Office 2,745,535
Patented May 15, 1956

2,745,535

BEAM TURNING DEVICE

Carl W. Schlegel, Allentown, Pa., assignor to Bethlehem Steel Company, a corporation of Pennsylvania Application October 21, 1949, Serial No. 122,636

5 Claims. (Cl. 198—33)

My invention relates to a device for turning heavy steel beams or the like rolled shapes while they are in motion laterally across the skids of a hot bed or other supporting conveyor.

In the manufacture of steel I-beams and similar structural shapes, the hot rolled section is delivered lengthwise on a roller table or the like from which it is transferred to a hot bed. While the beam is cooling and advancing laterally over the hot bed, it has a tendency to bend and become somewhat deformed, so the cooled piece is again transferred by means of a second roller table to a gag press or other straightening device.

For greater convenience in handling and a considerable decrease in sliding friction, it is generally desirable to turn the beams on the hot bed from an upright position on their bases to a side position, or about one quarter of a complete revolution on their longitudinal axes.

One object of my invention, therefore, is to provide a device for turning all sizes of beams from a vertical-web to a horizontal-web position while the beams are being conveyed across a hot bed.

Another object is a device which will prevent the turned beam from returning to its initial position.

Another object is a device which automatically resets after each turning operation.

Still other and further objects, purposes and advantages of my invention will appear hereinafter in the specification and attached four (4) sheets of drawings, and in the appended claims.

In the drawings:

Figure 1 is a top plan view showing the general arrangement of the turning devices in conjunction with the roller tables and a pair of hot beds;

Fig. 2 is an enlarged detail top plan view showing a portion of the central roller table with a pair of turning devices and pull-over cables on opposite sides of said roller table;

Fig. 3 is a side elevation of my turning device with various stages of the progress of the beam shown in dotted lines;

Fig. 4 is a detail section illustrating the shock spring arrangement for stopping the counterweighted bottom portion of the beam tilter arm;

Fig. 5 is a vertical transverse section taken on the line 5—5 of Fig. 2;

Fig. 6 is a detail top plan view of one of the pawl carriers;

Fig. 7 is a vertical longitudinal section of said pawl carrier on the line 7—7 of Fig. 8; and Fig. 8 is a transverse vertical section of the pawl carrier, taken on the line 8—8 of Fig. 6, and showing also the skid rails which function as guides on each side thereof.

Referring now to the various characters of reference on the drawings, the numeral 1 designates a portion of a conventional roller feed table upon which the I-beam 2 is delivered lengthwise from the rolling mill (not shown). Extending laterally on each side of the feed table 1 are the hot beds 3 and 4, across either of which the beam 2 may be pushed onto the roller receiving tables 5 or 6, and then transferred to one of the gag presses (not shown).

The roller tables 1, 5 and 6 are disposed in parallel relation to each other and are of similar and well-understood construction, comprising a frame 7 supported on any suitable foundation and in which are journaled a plurality of cylindrical rollers 8 driven by means of bevel gears 9 on shafts 10 and adapted to be rotated by motor units 11, 12 and 13.

The hot beds 3 and 4 include series of parallel shock rails 14 and pairs of skid rails 15 on suitable supports 16, which latter pair of skid-rails 15 are slightly below the level of the shock rails 14 and function both to support the moving beam 2 beyond the shock rails 14 and to serve as guides for the pawl carriers 17 with pivoted beam-engaging dogs 18. Said pawl carriers 17 are drawn by endless cables 19 or the like, secured thereto by sockets 20 and pins 21, and passing over grooved pulley wheels 22 and 23. The idle pulley wheels 22 are journaled in suitable supports 24 and the driving pulley wheels 23 are fastened onto shafts 25 which are adapted to be rotated by motor units 26, 27 and 28.

At suitably spaced intervals between the shock rails 14 on each hot-bed are aligned a plurality of turning devices 29. Each such turning device 29 is preferably constructed as shown in Figs. 3 and 4, of steel plates of suitable thickness cut to shape and welded together. Thus, the stand or pedestal 30 comprises a base plate 31, strengthened on its bottom surface by flat reinforcing bar 32, and having welded to its upper surface a pair of upright side plates 33, braced by side stiffeners 34, and connected in parallel spaced relation by inner spacer plates 35 and 36, upper rear stop bar 37, and fixed lower rear buffer plate 38. Suitable resilient means such as coil springs 39 and movable shock plate 40 are secured by the studs 41 and nuts 42 to said fixed buffer plate 38.

Said upright side plates 33 are provided with aligned upper apertures 43, ring plates 44, and a suitably lubricated bronze bushing 45, in which an end-slotted pin 46 secured by lock plates 47 pivotally supports centrally a large L-shaped lever 48. Said L-shaped lever 48 comprises an upper beam tilter arm 49 having welded stiffeners 50 and cut-away portions 51, and a lower depending return arm 52 terminating in a counterweight 53 normally resting against the buffer shock plate 40. The upper end of the beam tilter arm 49 comprises an elongated nose portion 54 and a coacting notch 55 on the side toward the advancing beam 2, said nose portion 54 normally projecting above the shock rails 14, for initially engaging the base of the beam.

Apertures 56 are also provided in the upright side plates 33 adjacent the rear stop bar 37, in register with one of the cut-away portions 51 of the beam tilter arm, to permit the insertion of lock pin 57 on the chain 58 to render the turning device inoperative when desired.

In operation, the pivoted dogs 18 of the pawl carriers 17 of whichever of the hot beds 3 or 4 is selected will engage one side of the base of the beam 2 and will pull the beam from the roller table 1 onto the shock rails 14 and skid rails 15 of the chosen hot-bed. Continued movement of said pawl carriers 17 will bring the opposite side of the beam 2 into simultaneous engagement with the notches 55 of the aligned beam tilter arms 49 and will cause the beam to rotate said beam tilter arms 49 about their pivot pins 46. The beam will then be turned 90° from its upright position onto its side. The beam tilter arms 49 will continue their rotatory movement until they are below the path of travel of the beam 2. When said beam 2 has traveled beyond the extremity of the nose portion 54 of each beam tilter arm 49, said turning device will be returned to its original position automatically by its counterweight 53.

Although I have shown and described my invention hereinabove in considerable detail, I do not wish to be limited narrowly to the exact and specific details so shown and described, but I may also use such substitutions, modifications, or equivalents thereof as are embraced within the scope of the invention or pointed out in the appended claims.

I claim:

1. A turning device adapted to be actuated by a beam advancing laterally, comprising an upright stand, a beam tilting lever pivotally supported thereon, stop means for controlling the movement of said lever, and lock means for rendering said lever inoperative when turning the beam is not required.

2. A turning device adapted to be actuated by a beam advancing laterally, comprising an upright stand, a beam tilting lever pivotally supported on said stand and having a notched upper end portion for engaging the beam, a depending arm and counterweight integral with said lever, and resilient buffer means on the stand for terminating the return movement of the counterweight.

3. In combination with a support for receiving a workpiece and means for moving the workpiece across said support, an arm pivoted below said support with its outer end projecting above said support and extending toward the workpiece, said outer end having a recessed portion adapted on movement of the workpiece toward said arm to engage the leading edge of the workpiece and on further movement of the workpiece to elevate said leading edge and thereby rotate the workpiece rearwardly, said arm being adapted to be tilted on further movement of the workpiece until said arm is disposed entirely below the top of the support.

4. In combination with a support for receiving a workpiece and means for moving the workpiece across said support, an arm pivoted below said support with its outer end projecting above said support and extending toward the workpiece, said outer end being notched to receive and elevate the leading edge of the moving workpiece and thereby rotate the workpiece rearwardly, said arm being adapted to be tilted on further movement of the workpiece until said arm is disposed entirely below the top of the support.

5. In combination with a support for receiving a workpiece and means for moving the workpiece in one direction across said support, an arm pivoted below said support with its outer end projecting above said support and extending toward the workpiece, said outer end being notched to receive and elevate the leading edge of the moving workpiece and thereby rotate said workpiece rearwardly, said outer end being adapted to be moved onward by the workpiece until said end is below the top of the support, and means for returning the pivoted arm to its initial position after passage of the workpiece thereover.

References Cited in the file of this patent

UNITED STATES PATENTS

| | | |
|---|---|---|
| 1,327,315 | Davies | Jan. 6, 1920 |
| 1,376,300 | Thomas | Apr. 26, 1921 |
| 1,389,794 | Thiele | Sept. 6, 1921 |
| 2,387,674 | McIntire | Oct. 23, 1945 |
| 2,486,819 | Brown | Nov. 1, 1949 |
| 2,490,206 | Calley | Dec. 6, 1949 |

FOREIGN PATENTS

| | | |
|---|---|---|
| 77,895 | Austria | Aug. 25, 1919 |